Patented Oct. 16, 1951

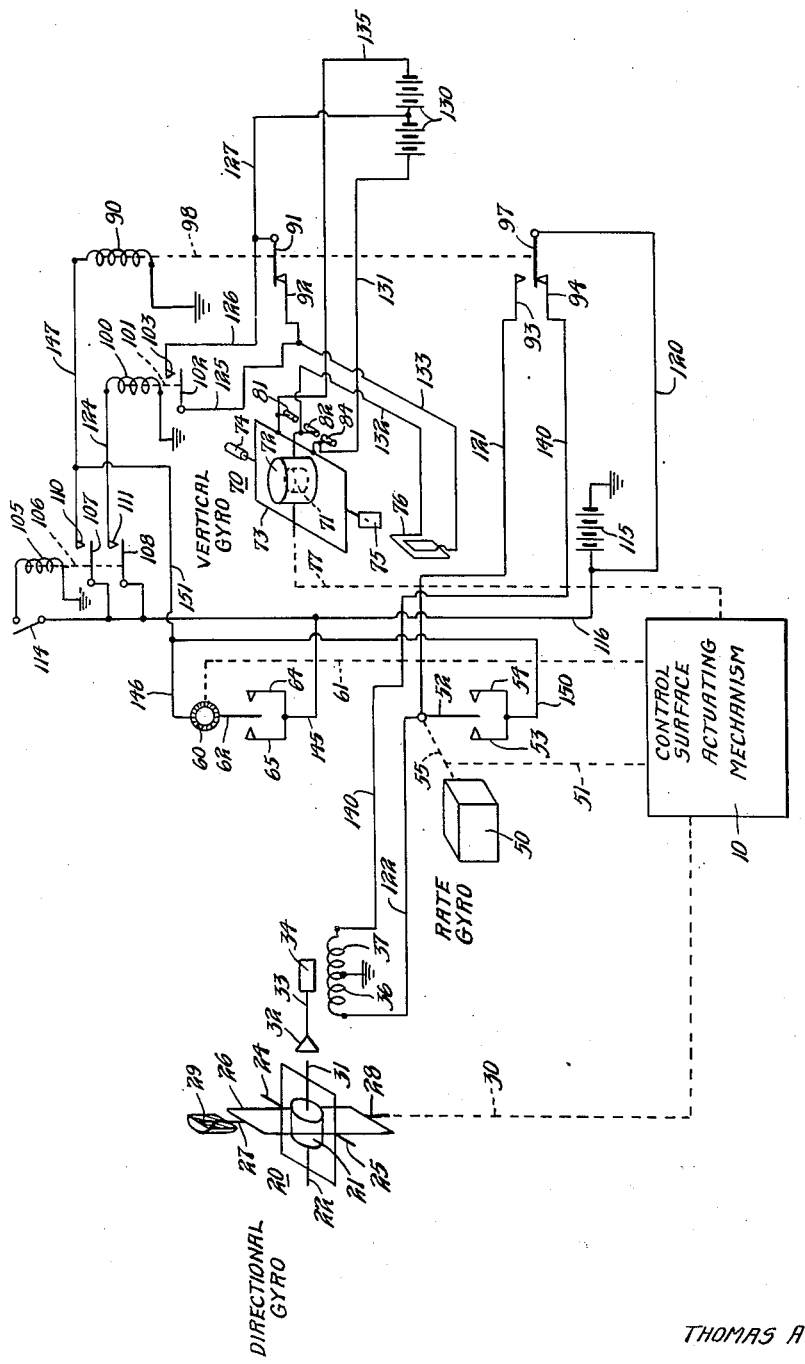

2,571,745

UNITED STATES PATENT OFFICE 2,571,745

CONTROL APPARATUS FOR AIRCRAFT

Thomas A. Moses, Jr., Edina, Minn., assignor to Minneapolis-Honeywell Regulator Company, Minneapolis, Minn., a corporation of Delaware Application July 28, 1947, Serial No. 764,233

17 Claims. (Cl. 244—77)

This invention is an improvement in flight control apparatus for an aircraft.

Many aircraft at the present time are provided with automatic flight control apparatus. This apparatus may be provided with a deviation responsive means which controls servomotors that actuate the control surfaces of the aircraft to maintain the aircraft on a desired heading. The deviation responsive means which controls the servomotors in many cases is a directional gyroscope. Such directional gyroscope maintains the desired heading of the aircraft due to the tendency of the gyro to maintain the rotor axis thereof in a fixed direction.

Such flight control apparatus may also be provided with a vertical flight gyroscope which through servomotors operates the ailerons to maintain the aircraft in a level position with respect to the roll axis. The vertical flight gyroscope may be provided with gravitationally responsive erecting means for maintaining the rotor of the vertical flight gyroscope perpendicular to the earth's surface.

This flight control apparatus may be provided with a manual controller for controlling the servomotors to operate the control surfaces to effect a manually selected change in heading. When a manually controlled turn is initiated, it is necessary to render the directional gyro powerless to oppose the change in heading. The directional gyro may be rendered powerless to oppose the change in heading by caging said gyroscope by the operation of the manual controller until the change in heading is effected. This manual controller is often returned to the unoperated position while the plane is yet changing heading.

While the erecting means for the vertical flight gyro, as long as the aircraft is in straight flight, will provide the proper erection for the vertical flight gyro yet when the aircraft is turning the erecting means is responsive also to centrifugal force due to the turn. This centrifugal force tends to cause the vertical flight gyro to erect to a false vertical. To avoid such false erection the erecting means for the vertical flight gyro may be rendered inoperative while the plane is making a change in heading.

An object of this invention therefore, is to cage the directional gyroscope when the manual controller for changing course is operated and to maintain the directional gyro caged until the change in heading is completed even if the manually operable controller is returned to unoperated position before the completion of the change in heading.

A further object of this invention is to effect caging of the directional gyroscope on movement of the manually operable controller to change heading and to maintain said directional gyroscope caged as long as the aircraft is turning by means responsive to a change in heading of the aircraft.

A further object of this invention is to cage said directional gyroscope on operation of the manually operable controller to initiate change in heading and to maintain said directional gyro caged with said manual controller in unoperated position by means responsive to the change in heading of the aircraft. This means responsive to the change in heading of the aircraft is also utilized in controlling the actuating means for the control surface.

A further object of this invention is to render ineffective the erecting means for the vertical flight gyro about the roll axis of the aircraft upon movement of the manually operable controller to change heading of the aircraft and to maintain said erecting means ineffective as long as the aircraft is changing heading by means responsive to a change in heading of the aircraft.

A further object of this invention is to effect caging of the directional gyroscope and to render ineffective erecting means for a vertical flight gyroscope when a manually operable controller is operated to initiate a change in heading of the aircraft and to uncage the directional gyroscope and to render the erecting means effective with the manual controlled in unoperated position.

A further object of this invention is to cage the directional gyroscope and to render the erecting means for the vertical flight gyroscope ineffective when the manual controller is operated to initiate a change in heading of the aircraft, to maintain the directional gyroscope caged and the erecting means ineffective with the manually operable controller in unoperated position by means responsive to a change in heading of the aircraft, and to uncage the directional gyroscope and to render the erecting means effective when the aircraft ceases to change heading.

A further object of this invention is to cage said directional gyroscope and to render the erecting means effective.

Further objects and advantages of this invention will be apparent from the following description of one embodiment thereof considered in conjunction with its illustration.

Referring to the illustration which shows one form that my invention may assume, a control surface actuating mechanism 10, which may be of the type disclosed in Patent No. 2,561,873, dated July 24, 1951, to Robert J. Kutzler, operates the conventional rudder and ailerons of an aircraft. The actuating mechanism 10 is controlled by a directional gyro 20 responsive to deviations of the aircraft about a vertical axis and a rate gyro 50 responsive to the rate of deviation of the aircraft about the same axis to stabilize the aircraft on a desired heading.

At times it may be desirable to alter the course of the aircraft from the direction on which it is stabilized by the gyro 20 and rate gyro 50 and such change in course may be initiated by the operation of a manually operable turn control 60 which through control mechanism in the actuating mechanism effects the operation of the servomotors whereby the control surfaces are positioned to cause a change in the course of the aircraft. During such change in course the directional gyro 20 which normally stabilizes the aircraft on its heading is rendered ineffective so that it cannot oppose the changes in course proposed.

A vertical flight gyro 70 through the control surface actuating mechanism stabilizes the aircraft against deviations caused by movement of the aircraft about the roll axis. The vertical flight gyro 70 is provided with erecting means for maintaining the gyro erect with respect to the roll axis. The type of erecting means used is of the gravitationally responsive type and therefore is such as to give a false erection of the gyro when the aircraft is turning since centrifugal force affects said erecting means; consequently, upon operation of the manually operable means 60 to change the course of the aircraft, the erecting means for the vertical flight gyro is rendered ineffective.

Since the manually operable turn control means 60 may be returned to unoperated position before the aircraft has finished turning, the rate gyro 50 is utilized to maintain the erecting means ineffective and the directional gyro ineffective until the aircraft has completed the change in heading.

With this general concept of the nature of the invention, the component parts thereof and their interconnection will be described in detail.

The directional gyro 20 comprises a rotor 21 whose axis of rotation is maintained horizontal by rotationally supporting its spindle 22 in an inner Cardan ring 23 which has its trunnions 24, 25 carried by an outer Cardan ring 26. The outer Cardan ring 26 has trunnions 27, 28 journaled in bearings 29 (only one of which is shown) whereby the outer Cardan ring may move about a vertical axis to maintain the direction of the rotor axis. A mechanical transmission arrangement 30 extends from the lower trunnion 28 to the wiper 259 in the control mechanism in the actuating mechanism 10 to provide a control effect similar to that provided in the aforementioned Patent No. 2,561,873 by deviation responsive means 67.

The right end of the rotor spindle 22 extends beyond the inner Cardan ring 23 at 31. Portion 31 of spindle 22 forms part of any suitable caging mechanism which is shown for simplicity of illustration as comprising a caging cone 32 carried by a slideable bar 33. The opposite end of bar 33 carries an armature 34 which coacts with a caging motor 36 and an uncaging motor 37. The caging motor 36 operates to move the bar 33 and therefore the cone 32 toward the left into engagement with portion 31 of spindle 22 to center the portion 31. The uncaging motor 37 cooperates with the armature 34 to move the bar 33 toward the right to disengage cone 32 and portion 31. Suitable stops not shown may be provided to limit the movement of the bar 33 by the cage and uncage motors 36, 37.

The rate gyro 50 may be similar to the conventional rate of turn indicator which generally comprises a rotor mounted for rotation about a horizontal axis in a single Cardan ring which is trunnioned for rotation about an axis at right angles to the gyro rotor axis in a horizontal plane. The trunnion is biased to a normal position by springs. When the aircraft moves about its turn axis the rate gyro is affected by the turning action and will precess about the horizontal axis of the trunnions. Such rate gyros are old and well known, an example being illustrated by the rate gyro 40 of Patent 2,283,754, dated May 19, 1942. Movement of the trunnions of the Cardan ring is transmitted through the operative connection 51 corresponding to operating connection 58 of Patent 2,561,873 to the control mechanism in the actuating mechanism for the control surfaces. Movement of the Cardan trunnions is also transmitted through connection 55 to a switch arm 52. The switch arm 52 coacts with two spaced contacts carried by resilient arms 53, 54.

The manually operable course change knob 60 is operatively connected through transmission means 61 to wiper 92 of network 95 of Patent 2,561,873, the control means for the actuating mechanism 10. The course change means 60 operates a switch arm 62 which coacts with two spaced contacts carried by spring arms 64, 65.

The vertical gyro 70 comprises a rotor 71 mounted for rotation about a vertical axis. The rotor is journaled in a casing 72. Casing 72 is trunnioned in a Cardan ring 73 and has an operating connection 77 connected to wiper 87 of Patent 2,561,873. The Cardan ring 73 is disposed in a horizontal plane and it is trunnioned in bearings 74, only one of which is shown, about an axis which is at right angles to the axis of the trunnions of casing 72. It may be seen that as thus mounted the rotor axis is carried by a support so that it can be positioned perpendicular to the surface of the earth.

The rotor 71 of gyro 70 is maintained vertical to the earth by rotation of the casing 72 about the axis of its trunnions in Cardan ring 73 or by rotation of the Cardan 73 in its bearings 74. Mechanism is shown whereby erection about the roll axis of the aircraft is achieved but erection about the pitch axis may be obtained by similar mechanism. Erection about the roll axis which is the axis of the trunnions of casing 72 in the Cardan 73 is effected by the coaction of a permanent magnet 75 carried by one trunnion of the Cardan 73 and a magnet coil 76 adjacent to magnet 75 and similar to that disclosed in the patent to Koster, 2,175,631, dated October 10, 1939. A field set up by current in magnet coil 76 exerts a torque on the permanent magnet 75 tending to rotate the Cardan 73 with its trunnions in bearings 74. Under the effect of this torque the gyro rotor 71 precesses about the trunnions of casing 72 carried by ring 73 whereby erection about the roll axis is obtained.

The direction of the current in magnet coil 76 is controlled by an erecting pickoff device comprising an arm 82 carried by an extension of the trunnion of casing 72 and two spaced pendulums 81, 84 carried by the Cardan 73. It is apparent that as the arm 82 has its position maintained in space by the rigidity of the rotor 71 and the pendulums 81, 84 are acted upon by gravity that either one or the other of the pendulums 81, 84 is brought into contact with arm 82. The pendulums 81, 84 and the arm 82 are insulatedly carried by the Cardan 73 and the trunnion of casing 72 respectively. Arms 81, 84 and pendulum 82 further carry contacts which when brought into engagement close suitable circuits to the magnet coil 76 of the erecting mechanism.

An erecting cutout and caging motor control relay coil 90 serves to operate its relay arms 91, 97 through its plunger 98. Switch arm 91 coacts with a single contact 92. Switch arm 97 on the other hand coacts with an upper contact arm 93 and a lower contact arm 94. Switch arms 91 and 97 are biased into engagement with contacts 92 and 94 by any suitable means (not shown) and are movable out of such engagement. Switch arm 97 moving into engagement with contact 93, upon the energization of coil 90.

An erection-make relay 100 operates through its armature 101 a switch arm 102 which coacts with an alternative erection circuit making a single contact 103.

An autopilot disengaged relay 105 through its armature 106 operates switch arms 107, 108 which respectively coact with switch contacts 110, 111. The circuit through the disengaged relay 105 is controlled by a single pole switch 114.

Operation

The structure in the position illustrated provides automatic stabilization of the aircraft in flight by the control from the gyros of the operation of the control surface actuating mechanism. Automatic control is preceded by the conventional manual control until the aircraft is at the desired altitude and on the desired heading. While the aircraft is thus manually controlled through the conventional stick, the actuating mechanism 10 is disengaged from the control surfaces and the manual control means may operate these control surfaces in any conventional manner as desired. The autopilot or automatic control apparatus is disengaged at this time and in this disengagement the control surface and its servomotor are no longer operatively connected as more fully disclosed in application 447,989. At this time also the switch 114 is closed. The disengage relay 105 will therefore be energized by a circuit extending from battery 115, lead 116, switch 114, relay 105 to ground and to the grounded side of battery 115. The energized relay 105 raises its armature 106 and causes switch arms 107, 108 to engage contacts 110, 111. The erection cutout and caging relay 90 is now energized from a circuit extending from battery 115, lead 116, switch arm 107, contact 110, lead 147, relay 90 to ground and to the grounded side of battery 115. Relay 90 raises its armature 98 to disengage switch arm 91 from contact 92 and to raise switch arm 97 into engagement with contact 93.

The engagement of switch arm 97 with contact 93 completes a circuit from battery 115, lead 120, arm 97, contact 93, lead 121, lead 122, caging motor 36, to ground, and to the side of battery 115. The caging motor 36 thereupon attracts its armature 34 to the left causing the caging cone to engage portion 31 of the directional gyro rotor spindle to bring the rotor to center and to hold it there whereby the directional gyro is locked to the frame of the aircraft.

The engagement of switch arm 108 of the autopilot disengaged relay 105 with contact 111 completes a circuit through erection make relay 100 extending from battery 115, lead 116, switch arm 108, contact 111, lead 124, relay 100 to ground, and to the grounded side of battery 115. Relay 100 in operating its plunger 101 raises contact arm 102 into engagement with contact 103 thereby shunting the now open switch comprising switch arm 91 and contact 92 associated with coil 90.

The operation of relay 100 while the autopilot is disengaged therefore provides a circuit for the magnet coil 76 of the erection mechanism which may extend from battery 130, lead 131, pendulum 84, arm 82, lead 132, magnet coil 76, lead 133, lead 125, switch arm 102, contact 103, lead 126, lead 127 to the center tap of battery 130 on the one hand or from battery 130, lead 135, pendulum 81, arm 82, lead 132, magnet coil 76, lead 133, lead 125, switch arm 102, contact 103, lead 126, lead 127, to the center tap of battery 130. It may be seen therefore that the magnet coil 76 of the erection motor is energized in one or the other directions depending whether pendulum 81 or pendulum 84 is brought into engagement with arm 82 of the vertical gyro 70. Through the aforementioned gravitational pickup control the vertical flight gyro is maintained erect with respect to the roll axis when the autopilot is disengaged. For example, assuming rotor 71 to be rotating clockwise when viewed from above, if pendulum 81 should contact arm 82, coil 76 will be energized to exert a counterclockwise torque on magnet 75. Rotor 71 will thereupon precess in a direction such that the upper face thereof rotates toward bearing 74. Precession continues until pendulum 81 disengages arm 82. The opposite action occurs when pendulum 84 engages arm 82.

The plane may now be manually controlled until such time as the aircraft is headed on a desired direction and is in level flight position. If the pilot wishes to fly an automatic pilot he engages the same and causes the switch 114 to open. The servomotors in the control surface actuating mechanism are now engaged with their respective control surfaces as disclosed in the aforementioned application. The opening of switch 114 deenergizes autopilot disengaged relay 105 permitting its armature 106 to drop by the effect of gravity or other suitable means.

The separation of switch arm 107 from contact 110 through the deenergization of disengaged relay 105 opens the circuit for the erection cutout and caging control relay 90. The armature 98 of relay 90 now drops under the effect of gravity to cause switch arm 91 to engage contact 92 and switch arm 97 to engage contact 94.

The separation of switch arm 108 from contact 111 by deenergization of disengaged relay 105 opens the circuits for erection make relay 100 which permits its armature 101 to drop, separating switch arm 102 from contact 103. The circuit for the magnet coil 76 of the erection mechanism may now be completed through switch arm 91 and contact 92 which are connected respectively with lead 127 and lead 133. The operation of the erection mechanism is therefore unaffected by the separation of switch arm 102 from contact 103 due to the deenergization of the erection make relay 100.

The lowering of armature 98 of the erection cutout and caging control relay 90 completes a circuit from battery 115, lead 120, switch arm 97, contact 94, lead 140, uncaging motor 37, to ground, and to the grounded side of battery 115. The energization of uncaging motor 37 causes it to attract armature 34 to the right thereby disengaging the caging cone 32 from portion 31 of the directional gyro rotor spindle.

The directional gyro 20 is now effective to maintain the aircraft on the desired heading. Should the aircraft deviate from the desired heading, the gyro rotor 21 through its spatial rigidity will maintain the trunnion 28 fixed in space. The transmission connection 30 will also be maintained in space whereas the part with which it coacts being carried by the plane will move with respect to the transmission 30. The relative movement of the transmission 30 with its coacting part will set up a control signal which will cause the actuating mechanism to operate the control surfaces to restore the craft to the original heading. The manner in which a directional gyro will maintain an aircraft on a desired heading is well known in the art and is further described in the aforesaid Patent 2,561,873.

While the aircraft is under the control of the automatic flight control apparatus, the vertical flight gyro 70 maintains the lateral level position of the aircraft. Should the aircraft tilt about the roll axis the gyro rotor 71 of the gyro 70 maintains the transmission connection 77 from the gyro vertical 70 to the actuating mechanism fixed in space. The part in the control mechanism of the actuating mechanism which coacts with the transmission 77 moves with respect thereto upon movement of the aircraft about the roll axis to set up a control signal. This control signal effects operation of the ailerons through the actuating mechanism to maintain the craft or to restore the craft to level position.

The gravitationally responsive pendulums 81, 84 coact with the arm 82 in straight flight in the manner described to maintain the gyro rotor axis perpendicular with respect to the roll axis of the aircraft. In other words while the aircraft is in straight flight, the axis of rotor 71 is maintained in a vertical plane, which passes through the longitudinal or roll axis of the aircraft, by the aforesaid erection control means.

At times it may be desirable to manually alter the course of the aircraft through the control surface actuating mechanism rather than by the manual operation of the control surfaces by the conventional stick and rudder bar. To effect such change in course the pilot operates the manual turn control knob 60 to the right or to the left depending upon which direction he desires to alter his course. The rotation of turn control knob 60 through its operative connection 61 applies a control signal to the control surface actuating mechanism to operate the control surfaces on the aircraft to change the heading of the craft. The aircraft will continue to alter its heading as long as the turn control knob 60 is displaced from its normal position. The rotation of turn control knob 60 clockwise, for example, to effect a manually initiated turn also brings switch arm 62 into engagement with contact 65. Such operation of turn control knob 60 completes a circuit from battery 115, lead 116, lead 145, contact 65, switch arm 62, lead 146, lead 151, lead 147, erection cutout and caging control relay 90, to ground, and to the grounded side of battery 115. The operation of relay 90 raises plunger 98 to bring contact arm 97 into engagement with contact 93 and as previously described energizes the caging motor 36 to center and cage the rotor of direction gyro 20.

The circuit for the magnet coil 76 of the erection motor of vertical gyro 70 is also open at contact 92 due to the operation of relay 90.

The purpose in rendering the directional gyro ineffective or powerless to apply a control signal to the actuating mechanism which is done by caging the directional gyro in the present illustration is to prevent the directional gyro from opposing the change of heading selected by the turn control knob 60.

The object in opening the circuit for the magnet coil 76 upon operation of the turn control knob 60 is to prevent a false erection of the vertical gyro rotor 71. This false erection would arise when the aircraft is turning when due to the effect of centrifugal force on the pendulums 81 or 84, the erection motor 76 is energized at a time when the gyro rotor 71 of the vertical flight gyro 70 may actually be vertical to the earth's surface. For example, if the pendulum 81, 84 and the contact arm 82 be arranged crosswise in the aircraft but toward the rear of the craft from the position of the opposite side of the gyro 70 it is apparent that if the aircraft is turning toward the left that the effect of centrifugal force on pendulum 84 is to bring it into engagement with arm 82. The magnet coil 76 for the erection motor would now be energized at a time when the rotor 71 of gyro 70 might be in a vertical position with respect to the earth. Magnet coil 76 now being energized would precess the gyro 70 so that the gyro 71 would assume a false vertical with respect to the earth. In other words the gyro rotor 71 would be precessed in the direction of the apparent rather than the true vertical.

As the aircraft approaches but before it has attained the desired new heading the pilot will move the turn control knob 60 back to normal position. While the turn control knob 60 may at this moment be in normal position yet the aircraft has not stopped changing its heading but continues for a brief time in the turn. However the directional gyro 20 and the erection motor for vertical gyro 70 are still rendered ineffective due to the operation of the rate gyro 50 and its resultant effect on caging relay coil 90 to be described. As long as the aircraft is turning, the rate gyro 50 will respond to such turning action and will precess so that its arm 52 is brought into engagement with either contact 53 or 54. The engagement of switch arm 52 with either contact 53 or 54 follows upon the turning of the aircraft due to the rotation of turn control knob 60 previously described. The initial operation of the turn control knob 60 to cause the aircraft to turn had also caused the energization of relay coil 90. During the turning action of the plane, a holding circuit to relay 90 is completed from battery 115, lead 120, switch arm 97, contact 93, lead 121, switch arm 52, contact 53 or 54, lead 150, lead 151, lead 147, direction cutout and caging relay control coil 90, to ground, and to the sided battery 115.

This holding circuit for relay 90 is maintained even though turn control knob 60 be subsequently moved to its normal position. The holding circuit is maintained as long as the aircraft is turning which is until the aircraft reaches its desired new heading.

When the aircraft has reached its new heading and has stopped turning, the rate gyro 50 will no longer precess and its spring return means will permit it to centralize whereby switch arm 52 is brought into its central position as shown in the figure. The circuit to the relay coil 90 is now broken to permit the armature 98 thereof to drop bringing contact arm 91 into engagement with contact 92 and switch arm 97 into contact with contact 94.

The circuit for magnet coil 76 may now be completed through contact arm 82 and either pendulum 81 or 84 through switch arm 91 and contact 92 to maintain the vertical gyro rotor in a vertical position.

The circuit to the caging motor 36 of the directional gyro is broken between arm 97 and contact 93 when armature 98 drops whereas the circuit to the caging motor 37 is completed between arm 97 and contact 94 by such action thereby uncaging the directional gyro. In the uncaged position the directional gyro 20 now maintains the heading of the aircraft on the new course selected by the turn control knob 60.

It is now evident that I have now provided a novel means for manually effecting the change in heading of an aircraft. By the operation of a manual means through which the control surfaces are actuated to cause the aircraft to turn I render ineffective the directional gyro and the erecting mechanism for the vertical gyro. Furthermore, while the craft is turning or changing heading, the directional gyro and the erecting means are maintained ineffective by the operation of a turn responsive device despite the fact that the manual turn control means be returned to unoperated position. When the plane resumes its new heading at the end of the manually initiated turn, the directional gyro is rendered effective and the erection mechanism for the vertical flight gyro is rendered effective to perform their normal functions.

I therefore claim as my invention:

1. In control apparatus for an aircraft provided with control surface actuating mechanism; a directional gyro, caging and uncaging mechanism for said directional gyro, a vertical flight gyro, erecting means for said vertical flight gyro to maintain the gyro erect about one axis, a manual turn control member, additional means energized by operation of said turn control member for operating the caging mechanism of said directional gyro, and for rendering ineffective said erecting mechanism, control means operated by said turn control member for initiating a change in heading of said aircraft through said control surface actuating mechanism, means responsive to the resultant change in heading of the aircraft to maintain said additional means energized, said additional means being effective upon cessation of change in heading of said aircraft for uncaging said directional gyroscope and for rendering said erecting means effective.

2. In control apparatus for an aircraft provided with control surface actuating mechanism; a directional gyro, caging and uncaging mechanism for said directional gyro, a manually operable turn control member for initiating changes in heading of said aircraft through said control surface actuating mechanism; means operable upon movement of said turn control member to initiate turning of said aircraft, additional means operated by said turn control member to actuate said caging mechanism of said directional gyro, means responsive to the turning of said aircraft to maintain said additional means operated whereby said directional gyro remains caged with the turn control member in inoperative position, and said additional means being effective upon cessation of turning of said aircraft for operating the uncaging mechanism of said directional gyro.

3. In control apparatus for an aircraft provided with automatic course maintaining means including a directional gyro; caging and uncaging mechanism for said directional gyro; manual turn control means for initiating changes in heading of said aircraft; additional means operative upon movement of said turn control member for effecting operation of the caging mechanism of said directional gyro; means responsive to the change in heading of said aircraft to maintain said additional means operated and thus said directional gyro caged said additional means being effective upon cessation of change in heading of said aircraft to operate the uncage mechanism to uncage said directional gyro whereby said turn control means may be released before the change in heading of said aircraft is completed but the directional gyro is maintained ineffective in said course maintaining means until the aircraft is no longer undergoing a change in heading.

4. An apparatus mounted on a dirigible craft including a directional gyro; caging and uncaging mechanism for said directional gyro; a double throw caging control relay; means including a manually operable control member for closing a circuit through said caging relay; means including contacts in said relay for caging said directional gyro; means responsive to change in heading of said dirigible craft to maintain said relay energized; and contact means effective when said relay is deenergized to operate the uncaging mechanism to uncage said directional gyro.

5. In combination with a directional gyro having caging and uncaging mechanism and a vertical gyro having erecting means for maintaining its rotor in a normal position relative to the earth about an axis; a manually operable controller; additional means operated by said controller for operating the caging mechanism of said directional gyro and for rendering ineffective said erecting means; a turn responsive device for maintaining said directional gyro caged and said erecting means ineffective said additional means being operative upon return of said controller and said turn responsive device to unoperated position to uncage said directional gyro and to render said erecting means operative.

6. In an aircraft having apparatus for controlling the aircraft in flight including a directional gyro and a vertical flight gyro; caging and uncaging mechanism for said directional gyro; erecting means for said vertical flight gyro; a manually operable controller; additional means operated by said controller for operating said caging mechanism and for rendering said erecting means ineffective, further means operated by said controller for changing the course of said aircraft; means responsive to change in course to maintain said additional means operated and thus said directional gyro caged and said erecting means ineffective said additional means being operative upon return of said controller to unoperated position and cessation of turning to operate said uncaging mechanism to uncage said directional gyro and for rendering the erecting means effective.

7. In an aircraft having apparatus for controlling said aircraft in flight including a directional gyro having caging mechanism and a vertical flight gyro provided with erecting means; a manual control means; a relay energized upon operation of said manual means; further means operative upon operation of said manual means to change the course of said aircraft; means controlled by said operated relay for operating said caging means and for rendering said erecting means ineffective; means responsive to change in course for maintaining said relay energized with said manual means in unoperated position; and means operative when said relay is unenergized upon cessation of change in course to uncage said directional gyro and to render said erecting means effective.

8. In an aircraft having apparatus for controlling said aircraft in flight; a vertical flight gyro; erecting means for said vertical flight gyro; a manual course changer; additional means operable by said changer for rendering said erecting means ineffective; means responsive to change in course for maintaining said additional means operated with said course changer in unoperated position; and means operable upon cessation of change in course, when said maintaining means becomes ineffective, to render said erecting means effective.

9. In mechanism for controlling in flight an aircraft having control surface actuating means; a manual course changer connected to said actuating means; a vertical gyro provided with erecting means; relay means operated by said course changer; means operated by said relay to render said erecting means ineffective; means including means responsive to the change in course of said aircraft and said relay operated means for maintaining said relay means operated with said course changer in unoperated position said relay means being effective upon return of said turn responsive means to normal position for rendering said erecting means effective.

10. In apparatus for controlling an aircraft in flight; means responsive to deviations of the aircraft about the turn axis for maintaining the course of said aircraft; means responsive to gravitational force about an axis and thereby maintained in a selected plane with respect to the earth's surface; a manually operable course change means; means operated by said manual means to change the course of said aircraft; additional means operated by said course change means to render said deviation responsive means ineffective to control the flight of said aircraft, and to prevent the application of gravitational force about said axis to said gravitationally responsive means said additional means being operative upon return of said manual means to unoperated position with said change of course completed to render the deviation means effective and to render the gravitationally responsive means subject to gravitational force about said axis.

11. In apparatus for controlling an aircraft in flight, means responsive to deviations of the aircraft about the turn axis for maintaining the course of said aircraft; means responsive to gravitational force about an axis and thereby maintained in a plane perpendicular to the earth's surface for controlling the aircraft about the roll axis; a manually operable course change means; means operated by said manual means to change the course of said aircraft; additional means operated by said course change means to render said deviation responsive means ineffective to control the flight of said aircraft and to prevent the application of gravitational force about said axis to said gravitationally responsive means; means responsive to change in course of said aircraft to maintain said additional means operated, said additional means being effective upon cessation of change in heading of said aircraft to render said deviation responsive means effective and to render the gravitationally responsive means subject to gravitational force about said one axis.

12. Control apparatus for an aircraft having a control surface actuating mechanism whereby the aircraft may be controlled about an axis, comprising; means responsive to the deviation of the aircraft about said axis for controlling said actuating mechanism, a manually operable turn control member for controlling said actuating mechanism, further means operable by said turn control member for rendering said deviation responsive means ineffective to control said actuating mechanism, means responsive to the turning of an aircraft about said axis to maintain said further means operated and thus said deviation responsive means ineffective with the turn control member in unoperated position said further means being effective upon cessation of turning of said aircraft about said axis for rendering said deviation responsive means effective for controlling said actuating mechanism.

13. In an aircraft having apparatus for operating control surfaces of said aircraft in flight, comprising; means responsive to the deviations of the aircraft about one axis thereof for controlling said apparatus; means for maintaining a desired relation between said deviation responsive means and the surface of the earth; a manually operative member connected to said apparatus to change the craft position about a second axis; further means actuated by said member for rendering said maintaining means ineffective; means responsive to the movement of the aircraft about said second axis for retaining said maintaining means ineffective with said member in unoperated position said further means being operative upon cessation of turning of said aircraft about said second axis for rendering the maintaining means effective.

14. In apparatus for steering an aircraft, in combination; a directional gyroscope operating said apparatus upon change in position of said craft about its vertical axis; a vertical gyroscope operating said apparatus upon change in angular position of said craft about its longitudinal axis so that the apparatus is operated upon change in angular position of said craft about two axes; caging mechanism for said directional gyroscope; erecting means for said vertical gyroscope; manually positioned control means displaceable from a normal position for operating the caging mechanism to render said directional gyroscope ineffective to control said apparatus and rendering said erecting means effective so that said craft and vertical gyroscope may be placed about one axis in a normal relative position with respect to the earth; and further means operable on return of said manually positioned means to normal position for rendering said caging mechanism ineffective and to maintain said erecting means effective.

15. Control means for a directional gyroscope responsive to turns of an aircraft and having caging and uncaging mechanism comprising: a manually operable member; means operated by a movement of said member for controlling said caging means to cage said gyroscope to make it nonresponsive to turns of said craft; and a further craft turn responsive means operable through said operated means to maintain control of said caging mechanism despite return of said manually operable member to unoperated position.

16. In an aircraft having apparatus for automatically controlling the direction of said aircraft in flight; a manual course changer connected to said apparatus for selecting a new course; a vertical flight gyroscope; erecting means for said vertical flight gyroscope; additional means operated by said course changer for rendering ineffective said erecting means during said selective changes in course; means responsive to the change in course and connected to said apparatus and operable to maintain said additional means operated and thus said erecting means ineffective with said course changer returned into unoperated position; and means effective upon cessation of change in course, when said maintaining means is no longer operated, to render said erecting means effective.

17. Control apparatus for an aircraft having a control surface actuating mechanism whereby the aircraft may be controlled in heading, said apparatus comprising: means responsive to the deviation in heading of the aircraft for controlling said actuating mechanism whereby said heading is automatically maintained, a manually operable turn control member for controlling said actuating mechanism to change the heading of the aircraft, further means operable by said turn control member for rendering said deviation responsive means ineffective to control said actuating mechanism, and means responsive to the turning of the aircraft during said change in heading to maintain said further means operated and thus said deviation responsive means ineffective with the turn control member returned into unoperated position until such change in heading has been completed.

THOMAS A. MOSES, Jr.

REFERENCES CITED

The following references are of record in the file of this patent:

UNITED STATES PATENTS

| Number | Name | Date |
|---|---|---|
| 1,942,470 | Bassett | Jan. 9, 1934 |
| 2,197,898 | Roland et al. | Apr. 23, 1940 |
| 2,238,300 | Zand et al. | Apr. 15, 1941 |
| 2,280,116 | Carlson | Apr. 21, 1942 |
| 2,369,131 | Braddon et al. | Feb. 13, 1945 |